(12) United States Patent
Purkayastha et al.

(10) Patent No.: US 10,004,245 B2
(45) Date of Patent: Jun. 26, 2018

(54) GRANULATION OF A STEVIA SWEETENER

(75) Inventors: Siddhartha Purkayastha, London (GB); Avetik Markosyan, Yerevan (AM)

(73) Assignee: PureCircle Sdn Bhd, Kuala Lumpur (MY)

( * ) Notice: Subject to any disclaimer, the term of this patent is extended or adjusted under 35 U.S.C. 154(b) by 316 days.

(21) Appl. No.: 13/509,552

(22) PCT Filed: Nov. 9, 2010

(86) PCT No.: PCT/US2010/055960
§ 371 (c)(1),
(2), (4) Date: Jul. 30, 2012

(87) PCT Pub. No.: WO2011/059954
PCT Pub. Date: May 19, 2011

(65) Prior Publication Data
US 2012/0282389 A1    Nov. 8, 2012

Related U.S. Application Data

(63) Continuation-in-part of application No. 12/720,888, filed on Mar. 10, 2010, now Pat. No. 8,334,006, and a continuation-in-part of application No. 12/753,470, filed on Apr. 2, 2010, now Pat. No. 8,337,927.

(60) Provisional application No. 61/260,465, filed on Nov. 12, 2009, provisional application No. 61/260,593, filed on Nov. 12, 2009, provisional application No. 61/290,778, filed on Dec. 29, 2009.

(51) Int. Cl.
| | |
|---|---|
| A23L 1/236 | (2006.01) |
| A23C 9/13 | (2006.01) |
| A23G 3/36 | (2006.01) |
| A23G 3/48 | (2006.01) |
| A23G 9/32 | (2006.01) |
| A23G 9/42 | (2006.01) |
| A23P 10/25 | (2016.01) |
| A23L 27/30 | (2016.01) |

(52) U.S. Cl.
CPC ............ *A23C 9/1307* (2013.01); *A23G 3/36* (2013.01); *A23G 3/48* (2013.01); *A23G 9/32* (2013.01); *A23G 9/42* (2013.01); *A23L 27/36* (2016.08); *A23P 10/25* (2016.08); *A23V 2002/00* (2013.01)

(58) Field of Classification Search
CPC .......... A23C 9/1307; A23G 3/36; A23G 3/48; A23G 9/32; A23G 9/42; A23P 10/25; A23L 27/36; A23V 2002/00
USPC ......................................... 426/473.548, 658
See application file for complete search history.

(56) References Cited

U.S. PATENT DOCUMENTS

| | | |
|---|---|---|
| 3,723,410 A | 3/1973 | Persinos |
| 4,082,858 A | 4/1978 | Morita et al. |
| 4,171,430 A | 10/1979 | Matsushita et al. |
| 4,219,571 A | 8/1980 | Miyake |
| 4,361,697 A | 11/1982 | Dobberstein et al. |
| 4,454,290 A | 6/1984 | Dubois |
| 4,590,160 A | 5/1986 | Nishihashi et al. |
| 4,599,403 A | 7/1986 | Kumar |
| 4,612,942 A | 9/1986 | Dobberstein et al. |
| 4,657,638 A | 4/1987 | le Grand et al. |
| 4,892,938 A | 1/1990 | Giovanetto |
| 4,917,916 A | 4/1990 | Hirao et al. |
| 5,112,610 A | 5/1992 | Kienle |
| 5,576,042 A | 11/1996 | Fuisz |
| 5,779,805 A | 7/1998 | Morano |
| 5,962,678 A | 10/1999 | Payzant et al. |
| 5,972,120 A | 10/1999 | Kutowy et al. |
| 6,031,157 A | 2/2000 | Morita et al. |
| 6,080,561 A | 6/2000 | Morita et al. |
| 6,204,377 B1 | 3/2001 | Nishimoto et al. |
| 6,228,996 B1 | 5/2001 | Zhou et al. |
| 6,706,304 B1 | 3/2004 | Ishida et al. |
| 7,807,206 B2 | 10/2010 | Magomet et al. |
| 7,838,011 B2 | 11/2010 | Abelyan et al. |
| 7,862,845 B2 | 1/2011 | Magomet et al. |
| 8,030,481 B2 | 10/2011 | Prakash et al. |
| 8,257,948 B1 | 9/2012 | Markosyan |
| 2002/0132320 A1 | 9/2002 | Wang et al. |
| 2003/0161876 A1 | 8/2003 | Hansson et al. |
| 2003/0236399 A1 | 12/2003 | Zheng et al. |
| 2006/0083838 A1 | 4/2006 | Jackson et al. |
| 2006/0134292 A1 | 6/2006 | Abelyan et al. |
| 2006/0142555 A1 | 6/2006 | Jonnala et al. |
| 2007/0082102 A1 | 4/2007 | Magomet et al. |
| 2007/0082103 A1 | 4/2007 | Magomet et al. |
| 2007/0116800 A1 | 5/2007 | Prakash |
| 2007/0116819 A1 | 5/2007 | Prakash et al. |
| 2007/0116820 A1 | 5/2007 | Prakash |
| 2007/0116821 A1 | 5/2007 | Prakash |
| 2007/0116822 A1 | 5/2007 | Prakash |

(Continued)

FOREIGN PATENT DOCUMENTS

| | | |
|---|---|---|
| BR | P10701736 | 7/2008 |
| BR | PI0701736 | 7/2008 |

(Continued)

OTHER PUBLICATIONS a-Glucosyltransferase Treated Stevia, Japan's Specifications and Standards for Food Additives, VIII edition, 2009, p. 257.
Ahmed, et al., "Use of p-Bromophenacyl Bromide to Enhance Ultraviolet Detection of Water-Soluble Organic Acids (Steviolbioside and Rebaudioside B) in High-Performance Liquid Chromatographic Analysis", Journal of Chromatography, vol. 192, 1980, 387-393.
Chang, S. S. et al., "Stability Studies of Stevioside and Rebaudioside A in Carbonated Beverages", Journal of Agricultural and Food Chemistry, vol. 31, 1983, 409-412.
Chen, et al., "Enrichment and separation of rebaudioside A from stevia glycosides by a novel adsorbent with pyridyl group", Science in China, vol. 42, No. 3 1999, 277-282.

(Continued)

*Primary Examiner* — Leslie A Wong
(74) *Attorney, Agent, or Firm* — Briggs and Morgan, P.A.; Audrey J. Babcock

(57) ABSTRACT

A method for making a granulated *Stevia* sweetener is described. The resulting sweetener has a desirably high solubility level.

11 Claims, 1 Drawing Sheet

(56) References Cited

U.S. PATENT DOCUMENTS

| | | |
|---|---|---|
| 2007/0116823 A1 | 5/2007 | Prakash |
| 2007/0116824 A1 | 5/2007 | Prakash |
| 2007/0116825 A1 | 5/2007 | Prakash |
| 2007/0116826 A1 | 5/2007 | Prakash |
| 2007/0116827 A1 | 5/2007 | Prakash |
| 2007/0116828 A1 | 5/2007 | Prakash |
| 2007/0116829 A1 | 5/2007 | Prakash |
| 2007/0116830 A1 | 5/2007 | Prakash |
| 2007/0116831 A1 | 5/2007 | Prakash |
| 2007/0116832 A1 | 5/2007 | Prakash |
| 2007/0116833 A1 | 5/2007 | Prakash |
| 2007/0116834 A1 | 5/2007 | Prakash |
| 2007/0116835 A1 | 5/2007 | Prakash |
| 2007/0116836 A1 | 5/2007 | Prakash |
| 2007/0116837 A1 | 5/2007 | Prakash |
| 2007/0116838 A1 | 5/2007 | Prakash |
| 2007/0116839 A1 | 5/2007 | Prakash |
| 2007/0116840 A1 | 5/2007 | Prakash |
| 2007/0116841 A1 | 5/2007 | Prakash |
| 2007/0128311 A1 | 6/2007 | Prakash |
| 2007/0134390 A1 | 6/2007 | Prakash |
| 2007/0134391 A1 | 6/2007 | Prakash |
| 2007/0224321 A1 | 9/2007 | Prakash |
| 2007/0292582 A1 | 12/2007 | Prakash et al. |
| 2008/0064063 A1 | 3/2008 | Brandle et al. |
| 2008/0102497 A1 | 5/2008 | Wong et al. |
| 2008/0107775 A1 | 5/2008 | Prakash |
| 2008/0107776 A1 | 5/2008 | Prakash |
| 2008/0107787 A1 | 5/2008 | Prakash |
| 2008/0108710 A1 | 5/2008 | Prakash |
| 2008/0111269 A1 | 5/2008 | Politi et al. |
| 2008/0226797 A1 | 9/2008 | Lee et al. |
| 2008/0292764 A1 | 11/2008 | Prakash et al. |
| 2008/0292765 A1 | 11/2008 | Prakash |
| 2008/0292775 A1 | 11/2008 | Prakash |
| 2008/0300402 A1 | 12/2008 | Yang et al. |
| 2009/0017185 A1 | 1/2009 | Catani |
| 2009/0053378 A1 | 2/2009 | Prakash |
| 2009/0074935 A1 | 3/2009 | Lee |
| 2009/0079935 A1 | 3/2009 | Harris et al. |
| 2009/0104330 A1 | 4/2009 | Zasypkin |
| 2009/0142817 A1 | 6/2009 | Norman et al. |
| 2009/0226590 A1 | 9/2009 | Fouache et al. |
| 2010/0055752 A1 | 3/2010 | Kumar |
| 2010/0056472 A1 | 3/2010 | Duan et al. |
| 2010/0099857 A1 | 4/2010 | Evans et al. |
| 2010/0011215 A1 | 5/2010 | Abelyan et al. |
| 2010/0057024 A1 | 5/2010 | Cavallini et al. |
| 2010/0120710 A1 | 5/2010 | Watanabe et al. |
| 2010/0013756 A1 | 6/2010 | Prakash et al. |
| 2010/0018986 A1 | 7/2010 | Abelyan et al. |
| 2010/0189861 A1 | 7/2010 | Abelyan et al. |
| 2010/0227034 A1 | 9/2010 | Purkayastha et al. |
| 2010/0255171 A1 | 10/2010 | Purkayastha et al. |
| 2010/0278993 A1 | 11/2010 | Prakash et al. |
| 2010/0316782 A1 | 12/2010 | Shi et al. |
| 2011/0030457 A1 | 2/2011 | Valery et al. |
| 2011/0033525 A1 | 2/2011 | Lui |
| 2011/0092684 A1 | 4/2011 | Abelyan et al. |
| 2011/0104353 A1 | 5/2011 | Lee |
| 2011/0111115 A1 | 5/2011 | Shi et al. |
| 2011/0124587 A1 | 5/2011 | Jackson et al. |
| 2011/0160311 A1 | 6/2011 | Prakash et al. |
| 2011/0183056 A1 | 7/2011 | Morita et al. |
| 2011/0189360 A1 | 8/2011 | Yoo et al. |
| 2011/0195169 A1 | 8/2011 | Markosyan et al. |
| 2012/0164678 A1 | 6/2012 | Stephanopoulos et al. |
| 2012/0214752 A1 | 8/2012 | Markosyan |

FOREIGN PATENT DOCUMENTS

| | | |
|---|---|---|
| CN | 1049666 | 3/1991 |
| CN | 1100727 | 3/1995 |
| CN | 1112565 | 11/1995 |
| CN | 1192447 | 9/1998 |
| CN | 1238341 | 12/1999 |
| CN | 1349997 | 5/2002 |
| CN | 101200480 | 6/2008 |
| JP | 52005800 | 1/1977 |
| JP | 52083731 | 7/1977 |
| JP | 52100500 | 8/1977 |
| JP | 52136200 | 11/1977 |
| JP | 54030199 | 3/1979 |
| JP | 54132599 | 10/1979 |
| JP | 55039731 | 3/1980 |
| JP | 55081567 | 6/1980 |
| JP | 55092400 | 7/1980 |
| JP | 55120770 | 9/1980 |
| JP | 55138372 | 10/1980 |
| JP | 55159770 | 12/1980 |
| JP | 55162953 | 12/1980 |
| JP | 56099768 | 8/1981 |
| JP | 56109568 | 8/1981 |
| JP | 56121453 | 9/1981 |
| JP | 56121454 | 9/1981 |
| JP | 56121455 | 9/1981 |
| JP | 56160962 | 12/1981 |
| JP | 57002656 | 1/1982 |
| JP | 57005663 | 1/1982 |
| JP | 57046998 | 3/1982 |
| JP | 57075992 | 5/1982 |
| JP | 57086264 | 5/1982 |
| JP | 58020170 | 2/1983 |
| JP | 58028246 | 2/1983 |
| JP | 58028247 | 2/1983 |
| JP | 358020170 | 2/1983 |
| JP | 58212759 | 12/1983 |
| JP | 58212760 | 12/1983 |
| JP | 59045848 | 3/1984 |
| JP | 62166861 | 7/1987 |
| JP | 63173531 | 7/1988 |
| JP | H0195739 | 4/1989 |
| JP | 1131191 | 5/1989 |
| JP | 3262458 | 11/1991 |
| JP | 6007108 | 1/1994 |
| JP | 6192283 | 7/1994 |
| JP | 7143860 | 6/1995 |
| JP | 7177862 | 7/1995 |
| JP | 8000214 | 1/1996 |
| JP | 9107913 | 4/1997 |
| JP | 2000236842 | 9/2000 |
| JP | 2002262822 | 9/2002 |
| JP | 2010516764 | 5/2010 |
| KR | 20070067199 | 6/2007 |
| KR | 20080071605 | 8/2008 |
| KR | 20090021386 | 3/2009 |
| RU | 2111969 | 5/1998 |
| RU | 2123267 | 12/1998 |
| RU | 2156083 | 9/2000 |
| RU | 2167544 | 5/2001 |
| RU | 2198548 | 2/2003 |
| WO | 2005089483 | 9/2005 |
| WO | 2006072878 | 7/2006 |
| WO | 2006072879 | 7/2006 |
| WO | WO 2006/072879 | 7/2006 |
| WO | 2008091547 | 7/2008 |
| WO | 2009108680 | 9/2009 |
| WO | WO 2009/108680 | 9/2009 |
| WO | 2010118218 | 10/2010 |
| WO | 2011059954 | 5/2011 |
| WO | 2011112892 | 9/2011 |
| WO | 2011153378 | 12/2011 |
| WO | 2012082493 | 6/2012 |
| WO | 2012082677 | 6/2012 |
| WO | 2013022989 | 2/2013 |

OTHER PUBLICATIONS

Chen, et al., "Selectivity of polymer adsorbent in adsorptive separations of stevia diterpene glycisides", Science in China, vol. 41, No. 4 1998, 436-441.

Chen, et al., "Studies on the adsorptive selectivity of the polar resin with carbonyl group on rebaudioside A", Acta Polymeric Scnica, No. 4 1999, 398-403.

(56) References Cited

OTHER PUBLICATIONS

Crammer, et al., "Sweet glycosides from the *Stevia* plant", Chemistry in Britain, Oct. 1986, 915-916, 918.
Darise et al., "Enzymic Transglucosylation of Rubusoside and the Structure-Sweetness Relationship of Steviol Bisglycosides," Agric. Biol. Chem. vol. 48(10), 1984, 2483-2488.
Dubois et al., "Diterpenoid Sweeteners. Synthesis and Sensory Evaluation of Stevioside Analogues with Improved Organoleptic Properties," J. Med. Chem. vol. 28, (1985) 93-98.
Fuh, , "Purification of steviosides by membrane and ion exchange process", Journal of Food Science, vol. 55, No. 5 1990, 1454-1457.
Fukunaga et al., "Enzymic Transglucosylation Products of Stevioside: Separation and Sweetness-evaluation," Agric. Biol. Chem. vol. 53(6) (1989) 1603-1607.
Fullas et al., "Separation of natural product sweetening agents using overpressured layer chromatography," Journal of Chromatography vol. 464 (1989) 213-219.
Hale, et al., "Amylase of Bacillus Macerans", Cereal Chemistry, vol. 28, No. 1, Jan. 1951, 49-58.
International Search Report and Written Opinion of PCT/US2010/055960.
International Search Report and Written Opinion of PCT/US2011/028028.
International Search Report and Written Opinion of PCT/US2011/033734.
International Search Report and Written Opinion of PCT/US2011/033737.
International Search Report and Written Opinion of PCT/US2011/033912.
International Search Report and Written Opinion of PCT/US2011/035173.
International Search Report and Written Opinion of PCT/US2011/036063, dated Aug. 5, 2011.
International Search Report and Written Opinion of PCT/US2011/047498, dated Dec. 22, 2011.
International Search Report and Written Opinion of PCT/US2011/047499, dated Dec. 22, 2011.
International Search Report and Written Opinion of PCT/US2011/064343.
International Search Report and Written Opinion of PCT/US2012/024585.
International Search Report and Written Opinion of PCT/US2012/024722.
International Search Report and Written Opinion of PCT/US2012/030210.
International Search Report and Written Opinion of PCT/US2012/043294.
International Search Report and Written Opinion of PCT/US2012/051163.
International Search Report and Written Opinion of PCT/US2012/052659.
International Search Report and Written Opinion of PCT/US2012/052665.
International Search Report and Written Opinion of PCT/US2013/030439.
Jaitak, et al., "An Efficient Microwave-assisted Extraction Process of Stevioside and Rebaudioside-A from Stevia Rebaudiana (Bertoni)", Phytochem. Anal. vol. 20 2009 , 240-245.
Kennelly, "Sweet and non-sweet constituents of Stevia rebaudiana", *Stevia*: The genus *Stevia*, Taylor & Francis, 2002, 68-85.
Kinghorn, "Overview", *Stevia*: The genus *Stevia*, Taylor & Francis, 2002, 1-17.
Kitahata, S. et al., "Production of Rubusoside Derivatives by Transgalactosylation of Various b-Galactosidases", Agric. Biol. Chem., vol. 53, No. 11 1989 , 2923-2928.
Kobayashi, et al., "Dulcoside A and B, New diterpene glycosides from Stevia Rebaudiana", Phytochemistry, vol. 16 1977 , 1405-1408.
Kochikyan, et al., "Combined Enzymatic Modification of Stevioside and Rebaudioside A", Applied Biochemistry and Microbiology, vol. 42, No. 1, 2006, 31-37.
Kohda, et al., "New sweet diterpene glucosides from Stevia Rebaudiana", Phytochemistry, vol. 15 1976, 981-983.
Kovylyaeva, et al., "Glycosides from Stevia rebaudiana", Chemistry of Natural Compounds, vol. 43, No. 1 2007, 81-85.
Liu, et al., "Study of stevioside preparation by membrane separation process", Desalination, vol. 83 1991, 375-382.
Lobov, S. V. et al., "Enzymic Production of Sweet Stevioside Derivatives: Transglucosylation of Glucosidases", Agric. Biol. Chem., vol. 55, No. 12 1991, 2959-2965.
Montovaneli, et al., "The effect of temperature and flow rate on the clarification of the aqueous Stevia-extract in fixed-bed column with zeolites", Brazilian Journal of Chemical Engineering, vol. 21, No. 3 2004, 449-458.
Moraes, et al., "Clarification of Stevia rebaudiana (Bert.) Bertoni extract adsorption in modified zeolites", Acta Scientiarum, vol. 23, No. 6 2001, 1375-1380.
Ohta et al., "Characterization of Novel Steviol Glycosides from Leaves of Stevia rebaudiana Morita," J. Appl. Glycosi., vol. 57, 199-209, 2010.
Ohtani et al. "Chapter 7. Methods to improve the taste of the sweet principles of Stevia rebaudiana." the Genus *Stevia*, edited by A. Douglas Kinghorn, CRC Press 2001, Taylor and Francis, London and New York, pp. 138-159.
Phillips, K. C. , "Stevia: steps in developing a new sweetener", In T.H. Grenby, Editor, Developments in Sweeteners-3, Elsevier 1987, 1-43.
Pol, et al., "Comparison of two different solvents employed for pressurised fluid extraction of stevioside from Stevia rebaudiana: methanol versus water", Anal Bioanal Chem vol. 388 2007, 1847-1857.
Prakash et al., "Development of rebiana, a natural, non-caloric sweetener," Jul. 1, 2008, Food and Chemical Toxicology, vol. 46, Is. 7, Sup. 1, p. S75-S82.
Richman et al., "Fuctional genomics uncovers three glucosyltransferases involved in the synthesis of the major sweet glucosides of Stevia rebaudiana," The Plant Journal, vol. 41 (2005) 56-67.
Sakamoto et al., "Application of 13C NMR Spectroscopy to Chemistry of Natural Glycosides: Rebaudioside-C, a New Sweet Diterpene Glycoside of Stevia Rebaudiana", Chem. Pharm. Bull., vol. 25, 1977, 844-846.
Shi, et al., "Synthesis of bifunctional polymeric adsorbent and its application in purification of Stevia glycosides", Reactive & Functional Polymers, vol. 50 2002, 107-116.
Shibata et al., "Glucosylation of Steviol and Steviol-Glucosides in Extracts from Stevia rebaudiana Bertoni," Plant Physiol. vol. 95, (1991) 152-156.
Starratt, et al., "Rebaudioside F, a diterpene glycoside from Stevia Rebaudiana", Phytochemistry, vol. 59 2002 , 367-370.
Sweet Green Fields, LLC, "Notice to the U.S. Food and Drug Administration (FDA) that the use of Rebiana (Rebaudiosid A) derived from Stevia rebaudiana, as a Food Ingredient is Generally Recognized as Safe (GRAS)," Jan. 15, 2009, http:/www.accessdata.fda.gov/scripts/fcn/gras_notices/grn000282.pdf (obtained from the WEB on May 8, 2012) entire document esp. p. 22, Table 1.
Tanaka, O. , "Improvement of taste of natural sweeteners", Pure & Appl. Chem., vol. 69, No. 4 1997 , 675-683.
Teo, et al., "Validation of green-solvent extraction combined with chromatographic chemical fingerprint to evaluate quality of Stevia rebaudiana Bertoni", J. Sep. Sci, vol. 32 2009 , 613-622.
United Nations' Food and Agriculture Organization/Joint Expert Committee on Food Additives (2010) Steviol Glycosides, Compendium of Food Additive Specifications, FAO JECFA Monographs 10, 17-21.
van der Maarel et al., "Properties and applications of starch-converting enzymes of the a-amylase family," Journal of Biotechnology, vol. 94 (2002) 137-155.
Vasquez, Stimulation of the Gerbil's Gustatory Receptors by Some Potently Sweet Terpenoids, J. Agric. Food Chem., vol. 41, 1305-1310, 1993.

(56) References Cited

OTHER PUBLICATIONS

Yamamoto, K. et al., "Effective Production of Glycosyl-steviosides by a-1,6 Transglucosylation of Dextrin Dextranase", Biosci. Biotech. Biochem. vol. 58, No. 9 1994, 1657-1661.

Yoda, et al., "Supercritical fluid extraction from Stevia rebaudiana Bertoni using CO2 and CO2+ water: extraction kinetics and identification of extracted components", Journal of Food Engineering, vol. 57 2003, 125-134.

Zell, et al., "Investigation of Polymorphism in Aspartame and Neotame Using Solid-State NMR Spectroscopy", Tetrahedron, vol. 56, 2000, 6603-6616.

Zhang, et al., "Membrane-based separation scheme for processing sweetener from *Stevia* leaves", Food Research International, vol. 33 2000, 617-620.

Chang, S. S. et al., "Stability Studies of Stevioside and Rebaudioside A in Carbonated Beverages", *Materials and Methods*, 1-6.

Jaitak, et al., "An Efficient Microwave-assisted Extraction Process of Stevioside and Rebaudioside-A from Stevia Rebaudiana (Bertoni)", *Phytochem. Anal.* vol. 20 2009, 240-245.

Kitahata, S. et al., "Production of Rubusoside Derivatives by Transgalactosylation of Various b-Galactosidases", *Agric. Biol. Chem.*, vol. 53, No. 11 1989, 2923-2928.

Kobayashi, et al., "Dulcoside A and B, New diterpene glycosides from Stevia Rebaudiana", *Phytochemistry*, vol. 16 1977, 1405-1408.

Phillips, K. C., "Stevia: steps in developing a new sweetener", *In T.J. Grenby, Editor, Developments in Sweeteners-3, Elsevier* 1987, 1-43.

Prakash et al., "Development of rebiana, a natural, non-caloric sweetener," *Food and Chemical Toxicology*, Jul. 1, 2008, S75-S82, vol. 46 Is. 7 Sup. 1.

Shi, et al., "Synthesis of bifunctional polymeric adsorbent and its application in purification of Stevia glycosides", *Reactive & Functional Polymers*, vol. 50 2002, 107-116.

Tanaka, O., "Improvement of taste of natural sweeteners", *Pure & Appl. Chem.*, vol. 69, No. 4 1997, 675-683.

Zell, et al., "Investigation of Polymorphism in Aspartame and Neotame Using Solid-State NMR Spectroscopy", *Tetrahedron* 56, 2000, 6603-6616, Elsevier Science Ltd.

International Search Report and Written Opinion for PCT/US2010/055960, dated Jan. 25, 2011.

Office Action for Canadian Patent Application No. 2,780,561 (Canadian National Phase of PCT/US10/55960); Mar. 29, 2017.

Particle Size Distribution of High Solubility Rebaudioside A Powder
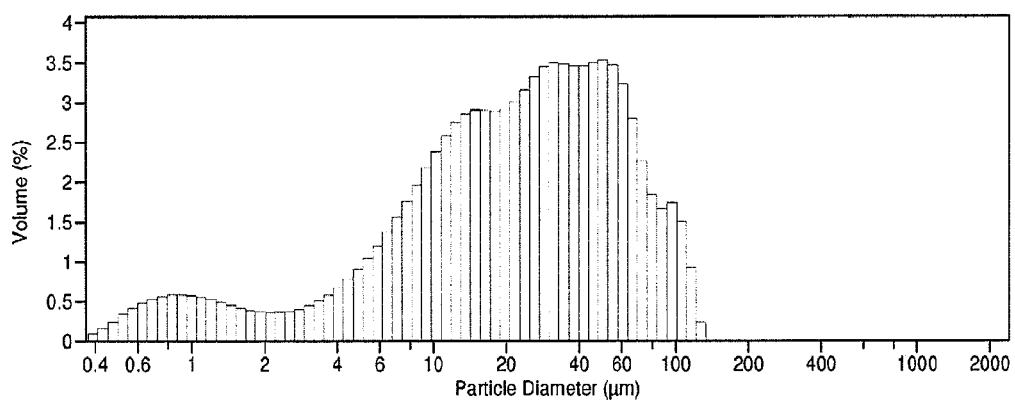

GRANULATION OF A STEVIA SWEETENER

RELATED APPLICATIONS

This application is a national stage application of International Application No. PCT/US2010/055960, filed Nov. 9, 2010, which claims the benefit of priority of U.S. Provisional Patent Application No. 61/260,465, filed Nov. 12, 2009, U.S. Provisional Patent Application No. 61/260,593, filed Nov. 12, 2009, and U.S. Provisional Patent Application No. 61/290,778, filed Dec. 29, 2009, and which is a continuation-in-part of U.S. patent application Ser. No. 12/720,888, filed Mar. 10, 2010, now U.S. Pat. No. 8,334,006 and U.S. patent application Ser. No. 12/753,470, filed Apr. 2, 2010, now U.S. Pat. No. 8,337,927 which applications are all hereby incorporated by reference in their entireties.

FIELD OF THE INVENTION

The invention relates to a process for the compaction and granulation of individual or combined sweet glycosides from a *Stevia rebaudiana* Bertoni plant extract, and more particularly for making a substantially dust-free granulated sweetener which may contain Stevia sweeteners with or without other co-ingredients such as but not limited to caloric or non-caloric sweeteners, taste modifiers and flavor modifiers.

DESCRIPTION OF THE RELATED ART

High intensity sweeteners possess a sweetness level many times exceeding that of sucrose. They are used widely in manufacturing of diet and reduced calorie food and beverage products. Although a natural caloric sweetener such as sucrose, fructose, and glucose provide the most desirable taste to consumers, they are caloric and cause increases in blood glucose levels. High intensity sweeteners, on the other hand, are essentially non-caloric, do not affect blood glucose levels, and provide little or no nutritive value.

However, high intensity sweeteners that generally are used as sugar substitutes possess taste characteristics which are different than those of sugar, such as sweet taste with different temporal profile, maximal response, flavor profile, mouthfeel, and/or adaptation behavior. For example, the sweet taste of some high intensity sweeteners is slower in onset and longer in duration than that of sugar, and thus change the taste balance of a food composition. Because of these differences, the use of high intensity sweeteners in replacing a bulk sweetener such as sugar in a food or beverage product causes an imbalance in the temporal and/or flavor profile. If the taste profile of high intensity sweeteners can be modified to impart desired taste characteristics that are similar, identical, or nearly identical to those of sugar or other natural caloric sweeteners, they can provide low calorie beverages and food products with taste characteristics that are more desirable to consumers. To attain the sugar-like temporal and/or flavor profile, several ingredients have been suggested.

On the other hand, high intensity sweeteners may have some cost and functional advantages compared to sugar. The competition between sugar and non-sugar high intensity sweeteners is strong in, for example, the soft drinks industry, especially in countries where their use and production is permitted and also in countries with overvalued sugar prices.

At present, high intensity sweeteners are used worldwide. They can be of both synthetic and natural origin.

Non-limiting examples of synthetic high intensity sweeteners include sucralose, potassium acesulfame, aspartame, alitame, saccharin, neohesperidin dihydrochalcone synthetic derivatives, cyclamate, neotame, dulcin, suosan, N—[N-[3-(3-hydroxy-4-methoxyphenyl)propyl]-L-α-aspartyl]-L-phenylalanine 1-methyl ester, N—[N-[3-(3-hydroxy-4-methoxyphenyl)-3-methylbutyl]-L-α-aspartyl]-L-phenylalanine 1-methyl ester, N—[N-[3-(3-methoxy-4-hydroxyphenyl)propyl]-L-α-aspartyl]-L-phenylalanine 1-methyl ester, salts thereof, and the like.

Non-limiting examples of natural high intensity sweeteners include Stevioside, Rebaudioside A, Rebaudioside B, Rebaudioside C, Rebaudioside E, Rebaudioside F, Steviolbioside, Dulcoside A, Rubusoside, mogrosides, brazzein, neohesperidin dihydrochalcone (NHDC), glycyrrhizic acid and its salts, thaumatin, perillartine, pernandulcin, mukuroziosides, baiyunoside, phlomisoside-I, dimethyl-hexahydrofluorene-dicarboxylic acid, abrusosides, periandrin, carnosiflosides, cyclocarioside, pterocaryosides, polypodoside A, brazilin, hernandulcin, phillodulcin, glycyphyllin, phlorizin, trilobtain, dihydroflavonol, dihydroquercetin-3-acetate, neoastilibin, trans-cinnamaldehyde, monatin and its salts, selligueain A, hematoxylin, monellin, osladin, pterocaryoside A, pterocaryoside B, mabinlin, pentadin, miraculin, curculin, neoculin, chlorogenic acid, cynarin, siamenoside and others.

High intensity sweeteners can be derived from the modification of natural high intensity sweeteners, for example, by fermentation, enzymatic treatment, or derivatization.

At present about eleven high intensity sweeteners are used worldwide. These are acesulfame-K, alitame, aspartame, cyclamate, glycyrrhizin, NHDC, saccharin, Stevioside, sucralose, thaumatin, neotame, and Rebaudioside A.

The high intensity sweeteners can be grouped into three generations. The first generation is represented by cyclamate, glycyrrhizin and saccharin, and has a long history of use in food. The second generation includes acesulfame-K, aspartame, NHDC and thaumatin. Alitame, neotame, sucralose, Stevioside, and Rebaudioside A belong to the third generation.

The standard sweetening power associated with each high intensity sweetener is given in TABLE 1. However, when they are used in blends, the sweetening power can change significantly.

TABLE 1

Sweetness Power of High Intensity Sweeteners

| Sweetener | Sweetness power |
|---|---|
| Saccharose | 1 |
| Acesulfame-K | 200 |
| Alitame | 2000 |
| Aspartame | 200 |
| Cyclamate | 30 |
| Glycyrrhizin | 50 |
| NHDC | 1000 |
| Saccharine | 300 |
| Stevioside | 200 |
| Rebaudioside A | 450 |
| Thaumatin | 3000 |
| Sucralose | 600 |

On the other hand, 'natural' and 'organic' foods and beverages have become the "hottest area" in the food industry. The combination of consumers' desire, advances in food technology, and new studies linking diet to disease and disease prevention have created an unprecedented opportunity to address public health through diet and lifestyle.

A growing number of consumers perceive the ability to control their health by enhancing their current health and/or hedging against future diseases. This creates a demand for food products with enhanced characteristics and associated health benefits, specifically a food and consumer market trend towards "whole health solutions" lifestyle. The term "natural" is highly emotive in the world of sweeteners and has been identified as one of key trust, along with "whole grains", "heart-healthy" and "low-sodium". 'Natural' term is closely related to 'healthier'.

In this respect, natural high intensity sweeteners can have a better commercial potential.

*Stevia rebaudiana* Bertoni is a perennial shrub of the Asteraceae (Compositae) family native to certain regions of South America. The leaves of the plant contain from 10 to 20% of diterpene glycosides, which are around 150 to 450 times sweeter than sugar. The leaves have been traditionally used for hundreds of years in Paraguay and Brazil to sweeten local teas and medicines.

At present there are more than 230 *Stevia* species with significant sweetening properties. The plant has been successfully grown under a wide range of conditions from its native subtropics to the cold northern latitudes.

Steviol glycosides have zero calories and can be used wherever sugar is used. They are ideal for diabetic and low calorie diets. In addition, the sweet steviol glycosides possess functional and sensory properties superior to those of many other high intensity sweeteners.

The extract of *Stevia rebaudiana* plant contains a mixture of different sweet diterpene glycosides, which have a single base—steviol—and differ by the presence of carbohydrate residues at positions C13 and C19. These glycosides accumulate in *Stevia* leaves and compose approximately 10%-20% of the total dry weight. Typically, on a dry weight basis, the four major glycosides found in the leaves of Stevia are Dulcoside A (0.3%), Rebaudioside C (0.6%), Rebaudioside A (3.8%) and Stevioside (9.1%). Other glycosides identified in Stevia extract include Rebaudioside B, C, D, E, and F, Steviolbioside and Rubusoside. Among steviol glycosides, only Stevioside and Rebaudioside A are available on a commercial scale.

The physical and sensory properties are well studied only for Stevioside and Rebaudioside A. The sweetness potency of Stevioside is around 210 times higher than sucrose, Rebaudioside A is between about 200 and about 400 times higher than sucrose, and Rebaudioside C and Dulcoside A are each around 30 times higher than sucrose. Rebaudioside A is considered to have most favorable sensory attributes of the four major steviol glycosides (TABLE 2).

TABLE 2

Physical and Sensory Properties of Steviol Glycosides

| Name | Formula | $T_{Melt}$, °C. | Mol. Weight | Optical rotation $[\alpha]^{25}_D$ ($H_2O$, 1%, w/v) | Solubility in water, % | Relative sweetness | Quality of taste |
|---|---|---|---|---|---|---|---|
| Steviol | $C_{20}H_{30}O_3$ | 212-213 | 318.45 | ND | ND | ND | Very bitter |
| Steviolmonoside | $C_{26}H_{40}O_8$ | ND | 480.58 | ND | ND | ND | ND |
| Stevioside | $C_{38}H_{60}O_{18}$ | 196-198 | 804.88 | −39.3 | 0.13 | 210 | Bitter |
| Rebaudioside A | $C_{44}H_{70}O_{23}$ | 242-244 | 967.01 | −20.8 | 0.80 | 200-400 | Less Bitter |
| Rebaudioside B | $C_{38}H_{60}O_{18}$ | 193-195 | 804.88 | −45.4 | 0.10 | 150 | Bitter |
| Rebaudioside C | $C_{44}H_{70}O_{22}$ | 215-217 | 951.01 | −29.9 | 0.21 | 30 | Bitter |
| Rebaudioside D | $C_{50}H_{80}O_{28}$ | 248-249 | 1129.15 | −29.5 (ethanol) | 1.00 | 220 | Like sucrose |
| Rebaudioside E | $C_{44}H_{70}O_{23}$ | 205-207 | 967.01 | −34.2 | 1.70 | 170 | Like sucrose |
| Rebaudioside F | $C_{43}H_{68}O_{22}$ | ND | 936.99 | −25.5 (methanol) | | ND | |
| Dulcoside A | $C_{38}H_{60}O_{17}$ | 193-195 | 788.87 | −50.2 | 0.58 | 30 | Very bitter |
| Steviolbioside | $C_{32}H_{50}O_{13}$ | 188-192 | 642.73 | −34.5 | 0.03 | 90 | Unpleasant |
| Rubusoside | $C_{32}H_{50}O_{13}$ | ND | 642.73 | 642.73 | ND | 110 | Very bitter |

There are several publications on the purification of some individual steviol glycosides.

Several patents describe the general process that can be used to make a *Stevia* extract: U.S. Pat. Nos. 3,723,410; 4,082,858; 4,171,430; 4,361,697; 4,599,403; 4,892,938; 5,112,610; 5,962,678; 5,972,120; 6,031,157; 6,080,561; 7,807,206; and JP No. 01-131191; each of which is incorporated by reference in their entirety herein.

Generally, the production of a Stevia extract includes extraction of plant material with water or water-organic solvent mixture, precipitation of high molecular weight substances, deionization, and decolorization, purification on specific macroporous polymeric adsorbents, concentration and drying.

The glycosides from leaves can be extracted using either water or organic solvent extraction. Supercritical fluid extraction and steam distillation have been described as well. Methods for recovery of diterpene sweet glycosides from *Stevia rebaudiana* using membrane technology, and water or organic solvents, such as methanol and ethanol, also are described in the literature.

The Stevia extract is dried by spray drying and/or vacuum drying technology to evaporate moisture and processing solvents from the extract. The resulting powder contains very fine particles with a very low moisture content and low bulk density, which makes it very dusty to handle during food application processing.

To overcome the issues associated with the very fine particle size and dust, agglomeration technology is used to reduce the hazardous nature of dust particles and their associated handling difficulty. However most commercial or industrial agglomeration technology requires the use of a binder, which may be water or a solution of adhesive molecules.

Using wet agglomeration technology, in which a wet binding component is utilized, may adversely affect the physical and chemical characteristics of Stevia molecules, especially the solubility of the Stevia extract. The current invention is able to provide a physical form of a Stevia sweetener product which is much more user-friendly and reduces dust or fines, without substantially changing the physical and chemical characteristics of the different Stevia sweetener molecules.

To enhance the sweetness profile and to reduce the aftertaste of high intensity sweeteners, one or more co-ingredients can be combined for specific food and beverage applications. This invention also helps in delivering the high intensity sweetener and one or more co-ingredients together in a calibrated proportion in a granulated particle form, which is process- and user-friendly.

Due to the physicochemical properties of Stevia sweeteners, not all granulation or agglomeration techniques are suitable to produce compositions with the desired properties. In particular, it is well known that Rebaudioside A exhibits so called polymorphism (Zell et al., "Investigation of Polymorphism in Aspartame and Neotame Using Solid-State NMR Spectroscopy." *Tetrahedron* 56(6603-6616), 2000). Rebaudioside A amorphous, anhydrous and solvate forms differ significantly from each other in terms of solubility which is one of the main criteria for the commercial viability of a sweetener. In this regard, as shown in Table 3, the hydrate form of Rebaudioside A displays the lowest solubility (Prakash et al., "Development of rebiana, a natural, non-caloric sweetener." *Food Chem. Toxicol.* 46(S75-S82), 2008). It was shown that Rebaudioside A may transform from one polymorph form to another at certain conditions (U.S. patent application Ser. No. 11/556,049) as summarized in Table 3. Therefore, processes employed in Rebaudioside A manufacturing should minimize the formation of forms with undesired characteristics. Many agglomeration techniques which allow contact of a solvent with a Rebaudioside A may facilitate formation of solvate forms with undesired characteristics. In case of water or a water-containing mixture or solution coming into contact with Rebaudioside A, a hydrate form may be obtained which is characterized as the form with lowest solubility.

TABLE 3

Properties of Rebaudioside A forms (U.S. patent application No. 11/556,049)

| | Polymorph Forms | | | |
|---|---|---|---|---|
| | Form 1 Hydrate | Form 2 Anhydrous | Form 3 Solvate | Form 4 Amorphous |
| Rate of dissolution in $H_2O$ at 25° C. | Very low (<0.2% in 60 minutes) | Intermediate (<30% in 5 minutes) | High (>30% in 5 minutes) | High (>35% in 5 minutes) |
| Alcohol content | <0.5% | <1% | 1-3% | <0.05% |
| Moisture content | >5% | <1% | <3% | 6.74% |

In addition, many processes employ binding agents or other auxiliary compounds which appear in the final product, thereby undesirably reducing the principal ingredient content.

There is therefore a significant need for a process of manufacturing granulated or agglomerated Rebaudioside A or other steviol glycosides having a desirably high solubility and containing a significant or maximized amount or concentration of the principal compound.

U.S. patent application Ser. No. 10/108,561, now abandoned, describes a method of producing corn starch granulate by combining the starch with granulation fluid, subjecting the mixture to wet sieving, drying and sizing. It is noted that the addition of granulation fluids in the case of Stevia sweeteners and Rebaudioside A will facilitate formation of low solubility polymorphs, which in turn will reduce the overall solubility of the final composition.

U.S. patent application Ser. No. 11/873,610, now U.S. Pat. No. 8,709,527, provides a method of producing granulated sweetening composition comprising poorly soluble polyol and hydrogenated dextrin. It is noted that including auxiliary compounds in a composition reduces the content of active ingredient.

U.S. patent application Ser. No. 11/979,530, now U.S. Pat. No. 8,052,999, describes a method for producing granules from powder by subjecting it to compacting force to produce a compacted mass comprising a mixture of fine particles and granules and separating the fine particles from granules by entrapping the fine particles in a gas stream.

U.S. Pat. No. 6,706,304 describes a method of preparing granular sweetener comprising Aspartame and Acesulfame K as active ingredients. The mixture of the ingredients was fed to the roller-compacter type granulator to obtain a granulated sweetener composition. It is noted that due to polymorphism of Stevia sweeteners and rebaudioside A, low solubility forms may be formed during such a process which will result in a final composition with an undesirably low solubility.

SUMMARY OF THE INVENTION

The invention is directed to a method for producing a sweetener comprising the steps of providing a Stevia sweetener powder, reducing the particle size of the Stevia sweetener powder, treating the Stevia sweetener powder under reduced pressure and elevated temperature, cooling down the treated Stevia sweetener powder; and holding the high solubility Stevia sweetener powder at low temperature to obtain a high solubility Stevia sweetener powder with increased solubility.

Hereinafter, unless specified otherwise, the solubility of a material is determined in reverse osmosis water at room temperature. Where the solubility is expressed as "%" it to be understood as number of grams of material soluble in 100 grams of solvent.

The invention is also directed to a method of roll compaction of a sweetener, starting with a high solubility sweetener powder, and introducing the high solubility sweetener powder to a roller compaction apparatus to produce a compacted material, introducing the compacted material to a size reducing apparatus to obtain a granule mixture, and fractioning the granule mixture through sieves of various sizes to obtain a granulated Stevia sweetener.

The invention further includes a high solubility Stevia sweetener powder, and a granulated Stevia sweetener.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention. The drawings illustrate embodiments of the invention and together with the description serve to explain the principles of the embodiments of the invention.

FIG. 1 shows the particle size distribution of a high solubility Rebaudioside A powder made in accordance with one embodiment of the invention.

DETAILED DESCRIPTION OF THE INVENTION

A process for the granulation of a Stevia sweetener, particularly Rebaudioside A, is described herein. The process includes the steps of reducing the particle size of a Rebaudioside A composition, drying the Rebaudioside A particles using a thermal treatment process, holding the Rebaudioside A particles under nitrogen gas, compacting the particles, then granulating them to a desired mesh size. The resulting granulated Rebaudioside A composition exhibits superior solubility and handling performance as compared to other Rebaudioside A compositions. Although the following description describes Rebaudioside A, it is to be understood that the processes and methods described herein are also suitable for use with any type of Stevia sweetener.

Crystalline Rebaudioside A has an inherently very low solubility, ranging from about 1%-2%. As described above, Rebaudioside A exhibits polymorphism, resulting in a variety of forms with very different characteristics and handling properties. The hydrate form has very low solubility (less than 0.2%), and is therefore not commercially viable as a sweetener. The solvate form has a solubility typically greater than 30%, but this form has only of scientific interest and cannot be used for food or beverage applications because the level of residual alcohol (1-3%) makes it unfit for use in foods and beverages. The anhydrous form has a solubility reported in literature of a maximum of up to about 30% solubility. The amorphous form has as solubility generally greater than 35%, but in the refining process, the amorphous form has to be dissolved in water and spray dried. The spray drying process necessitates the use of very diluted solutions, and spray drying itself is a very high energy consuming process, so this is not a viable option for the commercial production of Rebaudioside A.

The need exists, therefore, for a process in which a high solubility Rebaudioside A is obtained by a process which does not require significant dilution or a high energy level, and which does not result in a product having unacceptably high levels of alcohol. The process of the present invention achieves these objectives by creating a form of Rebaudioside A with a high level of solubility, but without the concomitant dilution, cost, or high alcohol content associated with other processes.

In one embodiment of the present invention, an initial material, comprising sweet glycosides of the *Stevia rebaudiana* Bertoni plant extract, which includes Stevioside, Rebaudioside A, Rebaudioside B, Rebaudioside C, Rebaudioside E, Rebaudioside F, Steviolbioside, Dulcoside A, Rubusoside and/or a mixture thereof was subjected to particle size reduction to produce a powder with mean particle size of between about 20-60 µm, preferably between about 25-40 µm. The powder with a particle size of less 20 µm exhibits low flowability reducing the efficiency of the process, whereas particles larger than 60 µm yield a product with low solubility. Any apparatus which may reduce a particle size of a solid substance, such as rotary mill, ball mill, pulverizer etc may be used for this process.

The powder thus obtained is subjected to a thermal treatment process under vacuum at between about 0-100 mbar pressure, preferably between about 5-15 mbar pressure. The duration of the thermal treatment may be between about 1-24 hours, preferably between about 2-6 hours. The temperature of the thermal treatment is between about 90-130° C., preferably between about 100-110° C. The powder is subjected to the thermal treatment for a period of time and at a temperature sufficient to remove all the water from the material, without significant product degradation.

Upon completion of the thermal treatment, preheated nitrogen is introduced into the vacuum chamber to equalize the pressure in the chamber with ambient pressure. The temperature of the preheated nitrogen in this nitrogen holding step is about 5° C. lower than the thermal treatment temperature. The vacuum chamber is connected to a vent which prevents excessive pressure buildup. The nitrogen flow is maintained at velocity which equals 1/10 of the vacuum chamber volume per minute. The nitrogen temperature is gradually decreased to about 25° C. over a period of between about 3-12 hours, preferably between about 4-6 hours. The nitrogen holding conditions are selected to provide uniform and smooth cooling conditions. Although nitrogen is described, any other substantially inert gas which will not hydrate, oxidize or otherwise chemically affect the product may be used.

In one embodiment, the high solubility powder was held under nitrogen at a temperature of between about 10-50° C., preferably between about 10-30° C. A temperature lower than 10° C. was found to result in ambient moisture condensation on the product further in the process, resulting in the low solubility hydrated form of Rebaudioside A. If the powder was treated with a temperature higher than 50° C., it resulted in an overheated compacted mass during roll compaction which quickly cooled down to the ambient temperature after compaction and yielded a Rebaudioside A product with low solubility.

The purpose of this process is to obtain a polymorph form of Rebaudioside A with a high solubility. The high solubility Rebaudioside A powder obtained by this process has a solubility that is greater than about 30%, or preferably is at least about 35% or at least about 40%.

As discussed above, the conventionally prepared anhydrous form of Rebaudioside A demonstrates a solubility of up to about 30%, and the amorphous form demonstrates a solubility that can be greater than 35%, but must be diluted significantly and spray dried when it is refined. Prior to the present invention, it has not been possible to provide a high solubility form of Rebaudioside A that is stable, easy to refine on a large scale, and does not require spray drying or other diluting processes during a commercial refining process. It was unexpectedly discovered that using the process of the present invention, including thermally treating a Rebaudioside A powder under vacuum and holding the powder under nitrogen gas, followed by dry roll compaction and granulation, a stable but very highly soluble form of Rebaudioside A can be produced.

While not intending to be bound by theory, it is believed that the high solubility form of Rebaudioside A made by the present invention is an anhydrous form of Rebaudioside A having significantly improved solubility properties as compared to a conventional anhydrous form of Rebaudioside A, and which can be refined into a granular form without the dilution or spray drying required to refine the amorphous form of Rebaudioside A.

Granulation refines the high solubility Rebaudioside A powder into a form suitable for further handling and for industrial or consumer use. Dry granulation provides numerous advantages over wet agglomeration, such as being a continuous process capable of internally recycling off-specification granules, not requiring any additional binding materials, and not requiring an additional drying step once the product is granulated.

One method of granulation is by using roll compaction, in which the powder is fed to two counter-rotating rolls which draw the powder between the rolls due to friction and compact the powder into a sheet or layer of material. Roll compaction inherently reduces the solubility of materials. Therefore, to achieve a desirable level of solubility in a granulated product, it is desirable to have a starting material with a high solubility rate prior to compaction, so that the resulting compacted and granulated material has the greatest solubility possible for a given material.

The granulated material made in accordance with the present invention advantageously yields a product with favorable characteristics such as solubility, particle size distribution and purity. In fact, it was discovered that the dissolution rate of the high solubility Rebaudioside A granulated particles of the present invention is actually greater, and even significantly greater, than the dissolution rate of the high solubility Rebaudioside A powder prior to roll compaction. While not intending to be bound by theory, it is believed that the granulation process of the present invention improves the dispersibility of the high solubility Rebaudioside A, resulting in a faster dissolution rate.

During compaction, if the roll pressure is too low, it may result in the formation of "loose" granules with poor mechanical stability. If the roll pressure is too high, it may result in "over-compacted" material which has a slower dissolution rate. In one embodiment of the present invention, the roll speed was between about 5-20 rpm, preferably between about 7-10 rpm, and more preferably about 9 rpm. The roll pressure was between about 10-60 bar, preferably between about 30-50 bar, and more preferably about 45 bar.

Numerous factors affect the solubility of a dry material, including the density of the material. It was found that suitable density values which provided the desired solubility values range from between about 0.35 to about 0.45 g/cc after roll compaction.

The compacted Rebaudioside A material can then processed by a granulating apparatus. In one embodiment, the apparatus contained two granulators—a pre-granulator and a fine granulator. The purpose of the granulators is to generate granules from compacted material produced by the roll compactor. Each granulator is equipped with rotors which press the coarse material through a U-shaped screen. If the screen size is too small, it results in an excessive amount of fine particles. If the screen size is too large, it produces large particles with a lower dissolution rate.

In one embodiment, the rotors were rotating at a rate of between about 50-2000 rpm, preferably between about 100-200 rpm, and more preferably at about 150 rpm. The granulators were equipped with screens which sizes were between about 0.5-6.0 mm, preferably between about 1-4 mm, and more preferably about 3.1 mm for the pre-granulator and about 1.6 mm for the fine granulator.

The resulting granulated Rebaudioside A product from this embodiment was fractioned on the sieves of US Mesh ##8; 10; 14; 20; 40 and 60. The results are presented in Table 4.

TABLE 4

| Particle size distribution | |
|---|---|
| US Mesh # | % retained |
| 8 | 0 |
| 10 | 0.1 |
| 14 | 26.3 |
| 20 | 39.5 |

TABLE 4-continued

| Particle size distribution | |
|---|---|
| US Mesh # | % retained |
| 40 | 24.8 |
| 60 | 6.5 |

About 2.8% of the material passed through the US Mesh #60 sieve.

The granulated Rebaudioside A sweetener obtained through the method of the present invention has a solubility ranging from about 1.0% to greater than 40%.

In one embodiment of the invention, the high solubility Rebaudiosde A powder can be mixed with other ingredients to form a Rebaudioside A blend prior to granulation. The high solubility Rebaudioside A powder is capable of being blended with other ingredients to achieve the proper distribution of all ingredients in the final product. Non-limiting examples of other ingredients which may be combined with the high solubility Rebaudioside A powder prior to granulation include: natural and synthetic high intensity sweeteners as described previously; natural sweeteners such as sucrose, fructose, glucose, maltose, lactose, tagatose, and palatinose; sugar alcohols such as erythritol; flavor modifying agents such as spices and extracts; taste modifying agents such as thaumatin, glycyrrhizin, Rebaudioside C, and Rebaudioside D; bulking agents or mouthfeel modifiers such as Fibersol®, soluble corn fiber, gum Arabic, pectin, isomaltooligosaccharide; and combinations thereof.

It has been discovered that by balancing the use of other ingredients in combination with Rebaudioside A, the flavor and temporal profiles of the resulting sweetener can be improved. For example, while not intending to be bound by theory, it is believed that using a very small amount of a taste modifying agent may serve to saturate or block the specific taste buds during the early part of consumption, thus making those taste buds unavailable for the transmittal of specific taste signals to the brain during the consumption of the rest of the beverage or food. The taste modifying agent itself may have a very high degree of the particular taste, such as bitterness, which is to be blocked by saturating the receptors on the tongue with that taste.

The sweetness profile of Rebaudioside A may also be enhanced with the use of sugar, such as cane or beet sugar. Although sugar and Stevia sweeteners have different melting characteristics and solubility, it is believed that the use of the dry roll compaction granulation process of the present invention results in a reduced calorie sugar-containing sweetener composition which is uniform and provides a consistent dispersion when used in a food or beverage application.

The following examples illustrate various embodiments of the invention. It will be understood that the invention is not limited to the materials, proportions, conditions and procedures set forth in the examples, which are only illustrative.

EXAMPLE 1

Preparation of High Solubility Rebaudioside A 100 kg of Rebaudioside A, containing Stevioside 0.2%, Rebaudioside C 0.2%, Rebaudioside F 0.3%, Rebaudioside A 97.5%, Rebaudioside D 1.1%, Rebaudioside B 0.5%, all percentages being on a percent dry weight basis, and having water solubility of 1.6% was placed into rotary blade milling machine and pulverized for 20 minutes. The resulting powder was analyzed by Beckman Coulter LS 13 320 Laser Diffraction Particle Size Analyzer. The results are summarized in Table 5.

TABLE 5

Powder Laser Diffraction Analysis Results

Volume Statistics

Operation Mode

| Calculations: | from 0.375 μm to 2000 μm |
|---|---|
| Mean: | 31.07 μm |
| Median: | 23.11 μm |
| Mean/Median ratio: | 1.344 |
| Mode: | 50.22 μm |
| S.D.: | 27.15 μm |
| Variance: | 737.4 μm² |
| C.V.: | 87.4% |

Distribution

| <10% | 3.356 μm |
|---|---|
| <25% | 10.11 μm |
| <50% | 23.11 μm |
| <75% | 45.76 μm |
| <90% | 70.19 μm |

The obtained powder was loaded into a 1000 L rotary vacuum dryer and dried at 105° C. at 10 mbar pressure for 3 hours. After 3 hours, preheated nitrogen at 100° C. was introduced into the vacuum chamber till ambient pressure was reached. Upon reaching ambient pressure, the vacuum dryer was connected to a vent and the nitrogen flow was continued at 100 L/min for a 4-hour time period. The temperature of the nitrogen gas was gradually decreased by 5° C. decrements until reaching 25° C. during the course of the 4-hour time period. A sample of the powder was withdrawn from the dryer and the solubility tested in deionized water at room temperature. The solubility was 41.1%, and the dissolution time was 7 minutes. The particle size distribution of the high solubility Rebaudioside A powder is shown in FIG. 1.

EXAMPLE 2

Granulation of Rebaudioside A 50 kg of high solubility Rebaudioside A prepared according to EXAMPLE 1 was placed into a 500 L double cone powder mixer and nitrogen at 10° C. was fed to the vessel for 1 hour. The powder was transferred to Alexanderwerk WP 50N/75 roller compactor. The compactor was operating at 9 rpm and 45 bar pressure. The compacted mass was fed to a pre-granulator and a fine granulator with rotors at rotating at 150 rpm. The screen size for the pre-granulator was 3.1 mm and for the fine granulator was 1.6 mm. The "overs" (particles that are too large) and "fines" (particles that are too small) were separated by top screen having a screen size of US Mesh 10 and bottom screen of US Mesh 40. The % ratio of "overs":"product":"fines" was 0.3%: 72.1%:27.6% respectively.

EXAMPLE 3

Granulation of Rebaudioside A 50 kg of high solubility Rebaudioside A prepared according to EXAMPLE 1 were granulated according to procedure of EXAMPLE 2. The compactor was operating at 18 rpm and 65 bar pressure. The compacted mass was fed to a pre-granulator and a fine granulator with rotors at rotating at 300 rpm. The screen size for the pre-granulator was 5 mm and for the fine granulator was 3 mm.

EXAMPLE 4

Granulation of Rebaudioside A 50 kg of high solubility Rebaudioside A prepared according to EXAMPLE 1 was granulated according to procedure of EXAMPLE 2. The compactor was operating at 9 rpm and 45 bar pressure. The compacted mass was fed to pre-granulator and fine granulators with rotors at rotating at 150 rpm. The screen size for the pre-granulator was 2 mm and for the fine granulator was 0.5 mm. The "overs" and "fines" were separated by top screen of US Mesh #10 and bottom screen of US Mesh #40. The yield of product was 34%, whereas 66% of product passed through US Mesh #40. Subsequent sifting of the material that passed through the US Mesh #40 through a US Mesh #80 sieve resulted in 28% of powder passing through the US Mesh #80.

EXAMPLE 5

Dissolution Rate of High Solubility Rebaudioside A

Four batches of high solubility Rebaudioside A powder were used for preparing the granulated product by using the roll compaction technology as described above. All powder and granulated samples were tested for their solubility and dispersion time. Testing was conducted by adding 5.0 g of powder or granulated high solubility Rebaudioside A in 500 ml water at ambient temperature. The mixture was then agitated with a magnetic stirrer to create a significant vortex for proper mixing. The dissolution rate was timed on a stop watch starting as soon as the high solubility Rebaudioside A was added directly to agitated water. The data, summarized in Table 6, showed that granulation shortened the dissolution time (the time to have clear solution) without any loss of solubility.

TABLE 6

Dissolution Times and Rates of High Solubility Rebaudioside A Powder and Granular Form

| Batch | Dissolution Time (Powder) | Dissolution Rate (Powder) | Dissolution Time (Granular) | Dissolution Rate (Granular) | % Rate Increase from Powder |
|---|---|---|---|---|---|
| 1 | 7 min 11 sec | 0.70 g/min | 6 min 35 sec | 0.76 g/min | 8.6% |
| 2 | 10 min 5 sec | 0.50 g/min | 4 min 41 sec | 1.07 g/min | 114% |
| 3 | 8 min 35 sec | 0.58 g/min | 5 min 36 sec | 0.90 g/min | 55% |
| 4 | 13 min 12 sec | 0.38 g/min | 5 min 11 sec | 1.00 g/min | 163% |

The process of the present invention resulted in a unique Rebaudioside A polymorph which demonstrated an unexpectedly higher degree of solubility in water than other polymorphic forms. Although the foregoing embodiments describe the use of Rebaudioside A, it is to be understood that any Stevia-based sweetener may be used and prepared in accordance with this invention, and all Stevia-based sweeteners are contemplated to be within the scope of the present invention.

Although the invention and its advantages have been described in detail, it should be understood that various changes, substitutions and alterations can be made herein without departing from the spirit and scope of the invention as defined by the appended claims. Moreover, the scope of the application is not intended to be limited to the particular embodiments of the invention described in the specification.

As one of ordinary skill in the art will readily appreciate from the disclosure of the invention, the compositions, processes, methods, and steps, presently existing or later to be developed that perform substantially the same function or achieve substantially the same result as the corresponding embodiments described herein may be utilized according to the invention.

We claim:

1. A method for producing a sweetener comprising the steps of:
    A) providing a *Stevia* sweetener powder;
    B) reducing the particle size of the *Stevia* sweetener powder to a particle size of between about 20 to 60 μm;
    C) treating the *Stevia* sweetener powder under reduced pressure of between about 0 mbar to 100 mbar and an elevated temperature of between about 90-130° C.;
    D) cooling down the treated *Stevia* sweetener powder to a low temperature of about 25° C.; and
    E) holding the cooled *Stevia* sweetener powder at the low temperature to obtain a high solubility *Stevia* sweetener powder with an increased solubility of at least about 30 g per 100 g of water; and
    F) introducing the high solubility *Stevia* sweetener powder to a roll compaction apparatus to produce a compacted material; introducing the compacted material to a size reducing apparatus to obtain a granule mixture; and fractionating the granule mixture through a top screen having a screen size of US Mesh 10 and a bottom screen having a screen size of US Mesh 40, to obtain a granulated *Stevia* sweetener having a dissolution rate greater than a dissolution rate of the high solubility *Stevia* powder.

2. The method of claim 1, wherein the dissolution rate of the granulated Stevia sweetener is at least about 0.75 grams per minute.

3. The method of claim 1 wherein *Stevia* sweetener is selected from a group consisting of: Stevioside, Rebaudioside A, Rebaudioside B, Rebaudioside C, Rebaudioside D Rebaudioside E, Rebaudioside F, Steviolbioside, Dulcoside A, Rubusoside, and a mixture thereof.

4. The method of claim 1, wherein cooling the treated *Stevia* powder comprises introducing preheated nitrogen gas into a vacuum chamber and gradually reducing the nitrogen gas temperature.

5. The method of claim 1, wherein the roll compaction apparatus operates at between about 5 rpm and about 20 rpm, and at a roll pressure of between about 10 bar to about 60 bar to produce the compacted material; and the size reducing apparatus comprises a set of sequentially located granulators equipped with rotors rotating at between about 50 rpm to about 2000 rpm to obtain the granule mixture.

6. The method of claim 1 wherein the *Stevia* sweetener powder is selected from a group consisting of: Stevioside, Rebaudioside A, Rebaudioside B, Rebaudioside C, Rebaudioside D, Rebaudioside E, Rebaudioside F, Steviolbioside, Dulcoside A, Rubusoside, and a mixture thereof.

7. The method of claim 1, further comprising the step of combining the *Stevia* sweetener powder with an additional ingredient before introducing the powder to the roll compaction apparatus.

8. The method of claim 7, wherein the additional ingredient is selected from the group consisting of: a high intensity sweetener; a natural sweetener; a sugar alcohol; a flavoring agent; a flavor modifying agent; a taste modifying agent; a bulking agent; and a combination thereof.

9. The method of claim 5, wherein the granulators comprise U-shaped screens having opening sizes ranging from about 0.5 mm to about 6.0 mm.

10. The method of claim 5, comprising a first granulator and a second granulator, said first granulator being equipped with a U-shaped screen having an opening size of about 3.1 mm and said second granulator being equipped with a U-shaped screen having an opening size of about 1.6 mm.

11. The method of claim 1, wherein the dissolution rate of the granulated *Stevia* sweetener is at least 8.6% greater than the dissolution rate of the high solubility *Stevia* powder.

* * * * *